(No Model.)
J. STRAUS.
SWEAT PAD HOOK.
No. 321,155. Patented June 30, 1885.
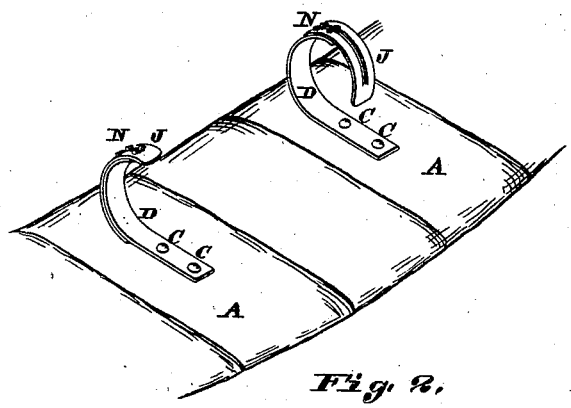
Fig. 1.
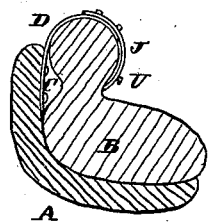
Fig. 2.
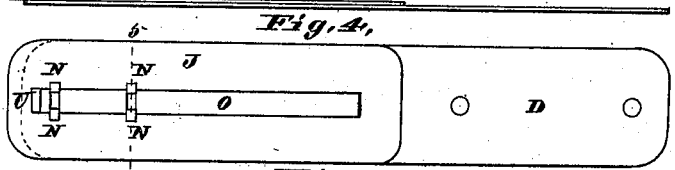
Fig. 3.
Fig. 4.
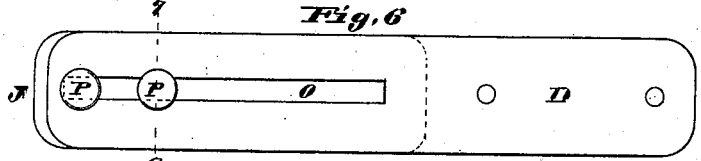
Fig. 5.
Fig. 6.
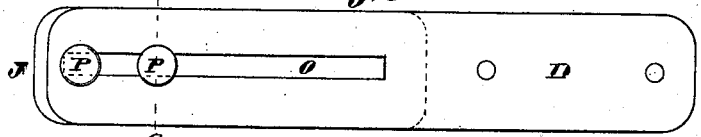
Fig. 7.
Attest:
Edward Stur
Geo. L. Wheelock.
Inventor:
Jacob Straus
By Knight Bros
Attys

UNITED STATES PATENT OFFICE.

JACOB STRAUS, OF ST. LOUIS, MISSOURI.

SWEAT-PAD HOOK.

SPECIFICATION forming part of Letters Patent No. 321,155, dated June 30, 1885.

Application filed February 24, 1885. (No model.)

*To all whom it may concern:*

Be it known that I, JACOB STRAUS, of the city of St. Louis, in the State of Missouri, have invented a certain new and useful Improvement in Sweat-Pad Hooks, of which the following is a full, clear, and exact description, reference being had to the accompanying drawings, forming part of this specification, and in which—

Figure 1 is a perspective view of part of a sweat-pad with my improved hook attached. Fig. 2 is a transverse section of a horse-collar and sweat-pad connected by my improved hook. Fig. 3 is an enlarged edge view of the plates before being bent to form the hook. Fig. 4 is a top view of same. Fig. 5 is a transverse section taken on line 5 5, Fig. 4. Fig. 6 is a similar view to Fig. 4, but illustrates a modified form of connection between the two plates of the hook. Fig. 7 is a transverse section taken on line 7 7, Fig. 6.

My invention relates to an improved hook for connecting sweat-pads to horse-collars ready for use; and my invention consists in features of novelty hereinafter fully described, and pointed out in the claims.

Referring to the drawings, A represents a part of a sweat-pad, and B a section of a horse-collar.

My hook is secured to the pad by rivets C or other suitable means, and consists of two plates, D J, one of which slides upon the other, so as to permit the hook to embrace the rim or small roll of the collar, as shown in Fig. 2 and the upper part of Fig. 1, or to be opened, as shown in the lower part of Fig. 1, to disconnect the pad from the collar. Both plates are curved, and the two together form a rigid hook that may be opened or closed as and for the purpose stated. My preferred manner of securing the two plates together is to cut lips N out of the plate D, which are extended up through a slot, O, in the plate J, and are bent over, thus connecting the two plates together, while the plate J is free to slide on the plate D, as shown. Another form of connection is to make a slot in one of the plates, through which extend rivets P, with heads on their outer ends that are made fast to the other plate.

There may be one or more sets of the lips N, as needed. I have shown two.

A portion of the plate J may be turned up at the end of the slot O, forming a lip or projection, U, to act as a finger-hole in moving the plate J.

I claim as my invention—

1. A sweat-pad provided with the hook made in two parts, substantially as described, one of which is adapted to slide upon the other, substantially as and for the purpose set forth.

2. In a sweat-pad attachment, the hook consisting of two sliding plates connected together by lips formed on one of the plates, substantially as described, extending through a slot in the other plate and bent over to secure the two together, substantially as and for the purpose set forth.

JACOB STRAUS.

In presence of—
   GEO. H. KNIGHT,
   SAML. KNIGHT.